Patented Jan. 16, 1940

2,187,383

UNITED STATES PATENT OFFICE 2,187,383

PROCESS OF LAMINATING WITH A UREA FORMALDEHYDE RESIN

Oskar R. Ludwig, Philadelphia, Pa., assignor to Röhm & Haas Company, Philadelphia, Pa.

No Drawing. Application June 13, 1936, Serial No. 85,049

17 Claims. (Cl. 154—2)

This invention relates to a plasticized urea formaldehyde resin made by adding to an intermediate, water soluble reaction product of urea and formaldehyde, an emulsion of a polymerized ester of an acrylic or α-substituted acrylic acid.

Urea formaldehyde resins possess many properties that are highly desirable in a resin to be used for molding or the treating of fibrous materials. They are hard, strong, light-fast, colorless materials, highly resistant to the action of solvents. They have the disadvantage of being brittle and are prone to crack on aging. Attempts have been made in the past to overcome these defects by adding plasticizing materials and several different substances have been suggested for this purpose. They may be divided into two classes—

A—High boiling esters, such as dibutyl phthalate, tricresyl phosphate, triacetin, castor oil, etc. These substances are not compatible however, to any appreciable extent with the hardened urea formaldehyde resins as ordinarily prepared. If they are added in quantities sufficient for plasticizing, they sweat out, causing the surface of the finished article to become oily and to gradually disintegrate.

B—Water soluble polyhydric alcohols, such as ethylene glycol, glycerin, etc. These substances are compatible with the hardened resins but have the distinct disadvantage that they have little, if any, plasticizing effect. The water resistance of the resulting compositions is so seriously impaired that they cannot be made stable toward varying atmospheric conditions.

The object of the present invention is to provide a stable plasticized urea formaldehyde resin that retains the desirable characteristics of such resins for molding and impregnating purposes but avoids their brittleness and tendency to crack on aging.

I have found that this can be accomplished by adding to a water soluble intermediate reaction product of urea and formaldehyde an emulsion of a polymerized ester of acrylic or α-substituted acrylic acid, and thereafter drying and completing the condensation. Although polymerized acrylic and α-methacrylic esters are incompatible with the usual urea formaldehyde resins used in casting, in molding powders and in impregnating solutions, when they are used together in proper proportions and with the technique herein described, they do not separate or act as a mixture of different types but give a composite material that possesses all the desirable characteristics of urea formaldehyde resins and in addition, a degree of flexibility not heretofore attained by them. In its internal structure I believe that the composite material I obtain has the gel structure of urea formaldehyde resins and that the polymerized esters are colloidally dispersed throughout it.

The polymerized esters useful in the invention are the esters of acrylic and α-substituted acrylic acids, such as α-methacrylic acid, polymerized either alone or in admixture with one another, or in admixture with other polymerizable organic monovinyl compounds, such as vinyl chloride, vinyl acetate, styrene, etc. These polymers are conveniently obtained in dispersed phase by emulsifying the monomeric esters, either alone or in admixture, in water with the aid of suitable emulsifying agents, and polymerizing the same in dispersed state. This process of obtaining emulsified polymeric esters is more fully described in copending application of Hermann Plauson, Serial No. 512,494 filed January 30, 1931.

The water soluble urea formaldehyde products that may be used in the present invention may be prepared with acid, alkaline or neutral catalysts or without catalysts. Thiourea may be used to replace all or part of the urea. The condensation products of other aldehydes, such as acetic aldehyde or benzaldehyde, with urea, thiourea and derivatives of these, may be used to replace all or part of the urea formaldehyde condensation product. In preparing the urea formaldehyde products, other forms of formaldehyde, such as paraformaldehyde and hexamethylenetetramine, may be used to replace part or all of the formaldehyde.

In carrying out my invention the emulsion of the polymer is added to an aqueous solution of an intermediate urea formaldehyde reaction product, care being taken that the resulting mixture is neutral or on the alkaline side of neutrality. The aqueous emulsions of polymeric esters are frequently slightly acid and can not be added as such to neutral urea formaldehyde condensation products without precipitating the polymerized ester from the emulsion and simultaneously advancing the urea formaldehyde product to the infusible gel state. However, if the emulsion be neutralized with a weak alkaline material, such as a solution of sodium carbonate or triethanolamine, or if the solution of urea formaldehyde reaction product be made sufficiently alkaline to neutralize the emulsion, the two can be readily mixed, giving a product that is homogeneous and stable. When once mixed the pH of the mixture remains fairly constant.

Very small amounts of the polymerized esters, as low as from 2–4%, have a remarkable plasticizing effect on the urea formaldehyde resins. The effect increases proportionally to the amount of ester up to 30%, at which point the desirable characteristics of urea formaldehyde resin are still maintained. Greater amounts of esters result in compositions which begin to lose gloss, surface hardness, and toughness. The most desirable results are obtained by using 15-25% of the polymerized esters. Esters of acrylic or methacrylic acid containing as high as 12 to 18 carbon atoms in the alcohol radical may be used, but I prefer the lower esters, particularly the methyl and ethyl esters of acrylic acid or methacrylic acid.

The aqueous mixture of polymeric esters and intermediate urea formaldehyde reaction product can be used as such for impregnating fibrous sheet material, such as fabrics or paper, and the impregnated sheets dried, laminated and molded, or the mixture may be dried and used in producing molding powders, molding sheets or blocks from which shaped articles can be prepared by the usual molding processes. Impregnated cellulosic sheets may also be used as glue film in the production of compound bodies such as ply wood, or the mixture may be used directly as an adhesive composition by coating surfaces to be joined, drying the coatings, and uniting the parts with heat and pressure. The mixtures may also be used in stiffening textiles and as binder for filling materials in producing special finishes thereon. However used, the articles obtained are much superior to those heretofore made from urea formaldehyde resins. They are especially distinguished by excellent flexibility and are not prone to cracking and crazing when exposed to varying atmospheric conditions.

My invention may be illustrated by the following examples. It should be understood that these examples are given for the purposes of illustration only and should not be construed as limiting the invention.

Example 1.—A water soluble urea formaldehyde condensation product is made by condensing one mol of urea (or thiourea) with two mols of formaldehyde in the absence of a condensing agent according to the method described by U. S. Patent 1,355,834 to John. To 100 pounds of an aqueous solution of this resin containing approximately 50% solids by weight and made slightly alkaline (pH 8.0 to 9.0) by the addition of sodium carbonate, is added 50 pounds of an emulsion (pH 4.5 to 5.5) containing 25% by weight polymerized methyl acrylate. The resulting mixture, to which pigments or dyes may be added, is used to impregnate cellulosic sheet material until the sheet contains approximately 60-70% by weight of resin and 30-40% cellulose. The impregnated sheet is then dried at a temperature of from 90-120° C. The presence of polymerized methyl acrylate makes the resin less sensitive to heat so that prolonged drying can be resorted to without impairing the flowing properties of the resin. The dried cellulosic sheets thus obtained are much more flexible than the sheets made with an equivalent quantity of an unplasticized urea formaldehyde resin and may be rolled without danger of breaking. The dried sheets may be molded by superimposing one upon another between heated platens, the molding being carried out as is usual in the art; that is, for 20-60 minutes at 110-130° C. and 1000-2000 pounds per square inch pressure. The laminated product obtained is very flexible, translucent to opaque, has an excellent surface gloss, and good electrical properties. Ethyl, propyl, and butyl acrylates may be used in place of methyl acrylate.

Example 2.—Fifty pounds of an emulsion of 25% polymerized ethyl methacrylate, which has previously been neutralized with a dilute triethanolamine solution, is added to 100 pounds of a neutral aqueous solution of a urea formaldehyde product as in Example 1. This solution may be used for the preparation of laminated or molded articles in the manner similar to that described in Example 1. In this case, also, the final product shows a much greater flexibility than would be shown by the unplasticized urea formaldehyde product. The product is translucent to opaque, and has an excellent glossy surface. Other methacrylic esters such as the methyl, propyl, and butyl esters may be substituted for the ethyl methacrylate.

Example 3.—Eighty-five pounds of dimethylolurea and 15 pounds of thiourea are dissolved in 70 pounds of water. The pH of the solution is adjusted with sodium carbonate to about 8-9. Forty pounds of an acid (pH 4-5) emulsion of 25% interpolymerized acrylates, consisting of 9 parts ethyl acrylate and 1 part methyl acrylate, is added with stirring, followed by 45 pounds of α-cellulose as sheet or fibre, and the materials are thoroughly mixed in a kneading machine of the Werner-Pfleiderer type. The excess of water is removed by oven-drying and the mixture compressed and rolled on hot rollers such as are used in rubber compounding. The material may be sheeted out on the rollers, but when cooled, is sufficiently brittle to permit its being readily reduced in a ball mill to powder which will pass a 20-40 mesh screen. One-quarter pound of zinc stearate, which acts as a mold lubricant, may be added, and the mixed powder used for molding in the usual type of hot mold. The powder yields molded pieces having a flexibility, resiliency and gloss greater than the ordinary urea formaldehyde products. The molded pieces are also more translucent than the ordinary products. Owing to the presence of polymerized acrylic esters, the heat sensitivity of the mixture during the rolling operation is considerably reduced, so that freeflowing molding powder with a minimum content of moisture can be prepared. As in the previous examples the polymer used in this one can be replaced by the other polymers herein mentioned.

In any of the given examples interpolymers of acrylic esters, of methacrylic esters and of acrylic and methacrylic esters with each other or with other polymerizable monovinyl compounds, such as are hereinbefore mentioned, may be used.

I claim:

1. A process for making laminated sheet material comprising the steps of impregnating cellulosic sheet material with a solution comprising a mixture of an aqueous solution of an intermediate urea formaldehyde condensation product and an aqueous emulsion of polymerized methyl acrylate in which the solids content of the mixture is from 15-25% methyl acrylate, drying the impregnated sheets, superimposing the dried sheets and heating them under pressure to unite the sheets and complete the condensation of the urea formaldehyde intermediate.

2. A process for making laminated sheet material comprising the steps of impregnating cellulosic sheet material with a solution comprising a mixture of an aqueous solution of an intermediate urea formaldehyde condensation product and an aqueous emulsion of a polymerized acrylic ester in which the solids content of the mixture is from 15-25% acrylic ester, drying the impregnated sheets, superimposing the dried sheets and heating them under pressure to unite the sheets and complete the condensation of the urea formaldehyde intermediate.

3. A process for making laminated sheet material comprising the steps of impregnating cellulosic sheet material with a solution comprising a mixture of an aqueous solution of an intermediate urea formaldehyde condensation product and an aqueous emulsion of a polymerized α-methacrylic ester in which the solids content of the mixture is from 15–25% α-methacrylic ester, drying the impregnated sheets, superimposing the dried sheets and heating them under pressure to unite the sheets and complete the condensation of the urea formaldehyde intermediate.

4. A process for making laminated sheet material comprising the steps of impregnating cellulosic sheet material with a solution comprising a mixture of an aqueous solution of an intermediate condensation product of a urea and formaldehyde and an aqueous emulsion of at least one polymerized member of the group consisting of acrylic and α-substituted acrylic esters in which the solids content of the mixture is from 2–30% polymerized ester, drying the impregnated sheets, superimposing the dried sheets and heating them under pressure to unite the sheets and complete the condensation of the urea formaldehyde intermediate.

5. The process which comprises mixing an aqueous solution of an intermediate urea formaldehyde condensation product and an aqueous emulsion of polymerized methyl acrylate, in such proportions that the solids content of the mixture is from 15–25% methyl acrylate, drying the mixture and thereafter heating it to complete the condensation of the urea formaldehyde intermediate.

6. The process which comprises mixing an aqueous solution of an intermediate urea formaldehyde condensation product and an aqueous emulsion of a polymerized acrylic ester, in such proportions that the solids content of the mixture is from 15–25% acrylic ester, drying the mixture and thereafter heating it to complete the condensation of the urea formaldehyde intermediate.

7. The process which comprises mixing an aqueous solution of an intermediate urea formaldehyde condensation product and an aqueous emulsion of a polymerized α-methacrylic ester, in such proportions that the solids content of the mixture is from 15–25% α-methacrylic ester, drying the mixture and thereafter heating it to complete the condensation of the urea formaldehyde intermediate.

8. The process which comprises mixing an aqueous solution of an intermediate condensation product of a urea and formaldehyde and an aqueous emulsion of at least one polymerized member of the group consisting of acrylic and α-substituted acrylic esters in such proportions that the solids content of the mixture is from 2–30% polymerized ester, drying the mixture and thereafter heating it to complete the condensation of the urea formaldehyde intermediate.

9. The process which comprises impregnating sheets of cellulosic material with an aqueous mixture of an emulsified polymerized acrylic ester and a water soluble intermediate reaction product of a urea and formaldehyde in which the solids content of the mixture is from 2 to 30% polymerized ester, and drying said impregnated sheets.

10. The process which comprises impregnating sheets of cellulosic material with an aqueous mixture of an emulsified polymerized α-methacrylic ester and a water soluble intermediate reaction product of a urea and formaldehyde in which the solids content of the mixture is from 2 to 30% polymerized ester, and drying said impregnated sheets.

11. The process which comprises impregnating sheets of cellulosic material with an aqueous mixture of an emulsified polymer of the group consisting of acrylic and α-substituted acrylic esters, and a water soluble intermediate reaction product of a urea and formaldehyde in which the solids content of the mixture is from 2 to 30% polymerized ester, and drying said impregnated sheets.

12. An improvement in the process of producing laminated articles wherein cellulosic sheet material is impregnated with an aqueous solution of an intermediate urea formaldehyde condensate, the impregnated sheets dried, the dried sheets superimposed one upon another and heated under pressure, said improvement comprising adding to the urea-formaldehyde solution prior to impregnation an aqueous emulsion of polymerized methyl acrylate in such proportions that the solids content of the mixture is from 2 to 30% polymerized ester.

13. An improvement in the process of producing laminated articles wherein cellulosic sheet material is impregnated with an aqueous solution of an intermediate urea formaldehyde condensate, the impregnated sheets dried, the dried sheets superimposed one upon another and heated under pressure, said improvement comprising adding to the urea-formaldehyde solution prior to impregnation an aqueous emulsion of at least one polymerized member of the group consisting of acrylic and α-substituted acrylic esters in such proportions that the solids content of the mixture is from 2 to 30% polymerized ester.

14. A plasticized urea formaldehyde resin composition adapted for molding under heat and pressure, comprising cellulosic sheet material impregnated with an intimate mixture comprising from 70 to 98% of a heat-hardenable urea-formaldehyde intermediate condensation product and from 2 to 30% of a polymerized acrylic ester.

15. A plasticized urea formaldehyde resin composition adapted for molding under heat and pressure, comprising fibrous cellulosic material impregnated with an intimate mixture comprising from 70 to 98% of a heat hardenable urea formaldehyde intermediate condensation product and from 2 to 30% of at least one polymerized member of the group consisting of acrylic and α-substituted acrylic esters.

16. A plasticized urea formaldehyde resin composition adapted for molding under heat and pressure comprising an intimate mixture of from 70 to 98% of a heat-hardenable urea formaldehyde intermediate condensation product and from 2 to 30% of at least one polymerized member of the group consisting of acrylic and α-substituted acrylic esters.

17. A plasticized urea formaldehyde resin composition adapted for molding under heat and pressure comprising cellulosic sheet material impregnated with an intimate mixture comprising from 70 to 98% of a heat-hardenable urea formaldehyde intermediate condensation product and from 2 to 30% of a polymerized α-methacrylic ester.

OSKAR R. LUDWIG.